(12) United States Patent
Speaker et al.

(10) Patent No.: US 9,761,332 B2
(45) Date of Patent: Sep. 12, 2017

(54) NUCLEAR REACTOR NEUTRON SHIELDING

(71) Applicant: Babcock & Wilcox mPower, Inc., Charlotte, NC (US)

(72) Inventors: Daniel P Speaker, Lynchburg, VA (US); Gary W Neeley, Forest, VA (US); James B Inman, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 280 days.

(21) Appl. No.: 14/299,353

(22) Filed: Jun. 9, 2014

(65) Prior Publication Data

US 2015/0357058 A1   Dec. 10, 2015

(51) Int. Cl.
*G21C 11/02* (2006.01)
*G21C 11/00* (2006.01)
*G21F 3/04* (2006.01)

(52) U.S. Cl.
CPC ............ *G21C 11/00* (2013.01); *G21C 11/028* (2013.01); *G21F 3/04* (2013.01); *Y02E 30/40* (2013.01)

(58) Field of Classification Search
CPC ....... G21C 11/028; G21C 11/00; G21C 11/02; G21F 3/04
USPC .................. 376/287, 288, 292, 285, 458
See application file for complete search history.

(56) References Cited

U.S. PATENT DOCUMENTS 3,153,636 A   10/1964   Shanta et al.
3,773,616 A   11/1973   Aubert
3,982,134 A * 9/1976   Housholder ............ G21F 5/008
                                                  376/272
4,038,136 A   7/1977   Gallet et al.
4,090,087 A * 5/1978   Weissenfluh ......... G21C 11/028
                                                  376/287

(Continued)

FOREIGN PATENT DOCUMENTS

DE   3507931   * 9/1985   ............. G21C 11/02
FR   2561027     9/1985

OTHER PUBLICATIONS

International Search Report and Written Opinion dated Sep. 11, 2015 for PCT/US15/34650.

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

A nuclear reactor includes a reactor pressure vessel and a nuclear reactor core comprising fissile material disposed in a lower portion of the reactor pressure vessel. The lower portion of the reactor pressure vessel is disposed in a reactor cavity. An annular neutron stop is located at an elevation above the uppermost elevation of the nuclear reactor core. The annular neutron stop comprises neutron absorbing material filling an annular gap between the reactor pressure vessel and the wall of the reactor cavity. The annular neutron stop may comprise an outer neutron stop ring attached to the wall of the reactor cavity, and an inner neutron stop ring attached to the reactor pressure vessel. An excore instrument guide tube penetrates through the annular neutron stop, and a neutron plug comprising neutron absorbing material is disposed in the tube at the penetration through the neutron stop.

15 Claims, 9 Drawing Sheets

(56) References Cited

U.S. PATENT DOCUMENTS

| | | | | |
|---|---|---|---|---|
| 4,123,662 | A | * | 10/1978 | Fisher .................... G21C 11/02 376/287 |
| 4,126,515 | A | * | 11/1978 | Klotz .................... G21C 11/028 376/205 |
| 4,650,643 | A | * | 3/1987 | Anthony ................ G21C 11/02 376/287 |
| 4,842,804 | A | * | 6/1989 | Hopkins .............. G21C 13/028 376/287 |
| 4,904,442 | A | * | 2/1990 | Swidwa ............... G21C 13/028 376/287 |
| 5,102,612 | A | * | 4/1992 | McDonald ........... G21C 13/028 376/288 |
| 5,241,573 | A | * | 8/1993 | Thacker .................... G21F 3/04 376/287 |
| 5,504,344 | A | * | 4/1996 | Stein ........................ G21F 3/00 250/496.1 |
| 5,699,394 | A | * | 12/1997 | Schreiber ............... G21C 11/08 376/289 |
| 2008/0035891 | A1 | | 2/2008 | Hayashi |
| 2008/0198960 | A1 | * | 8/2008 | Keegan .................. G21C 11/08 376/289 |
| 2010/0258751 | A1 | * | 10/2010 | Shayer ...................... G21F 5/00 250/506.1 |
| 2011/0002432 | A1 | | 1/2011 | Heibel et al. |
| 2013/0272470 | A1 | | 10/2013 | Whitten et al. |

\* cited by examiner

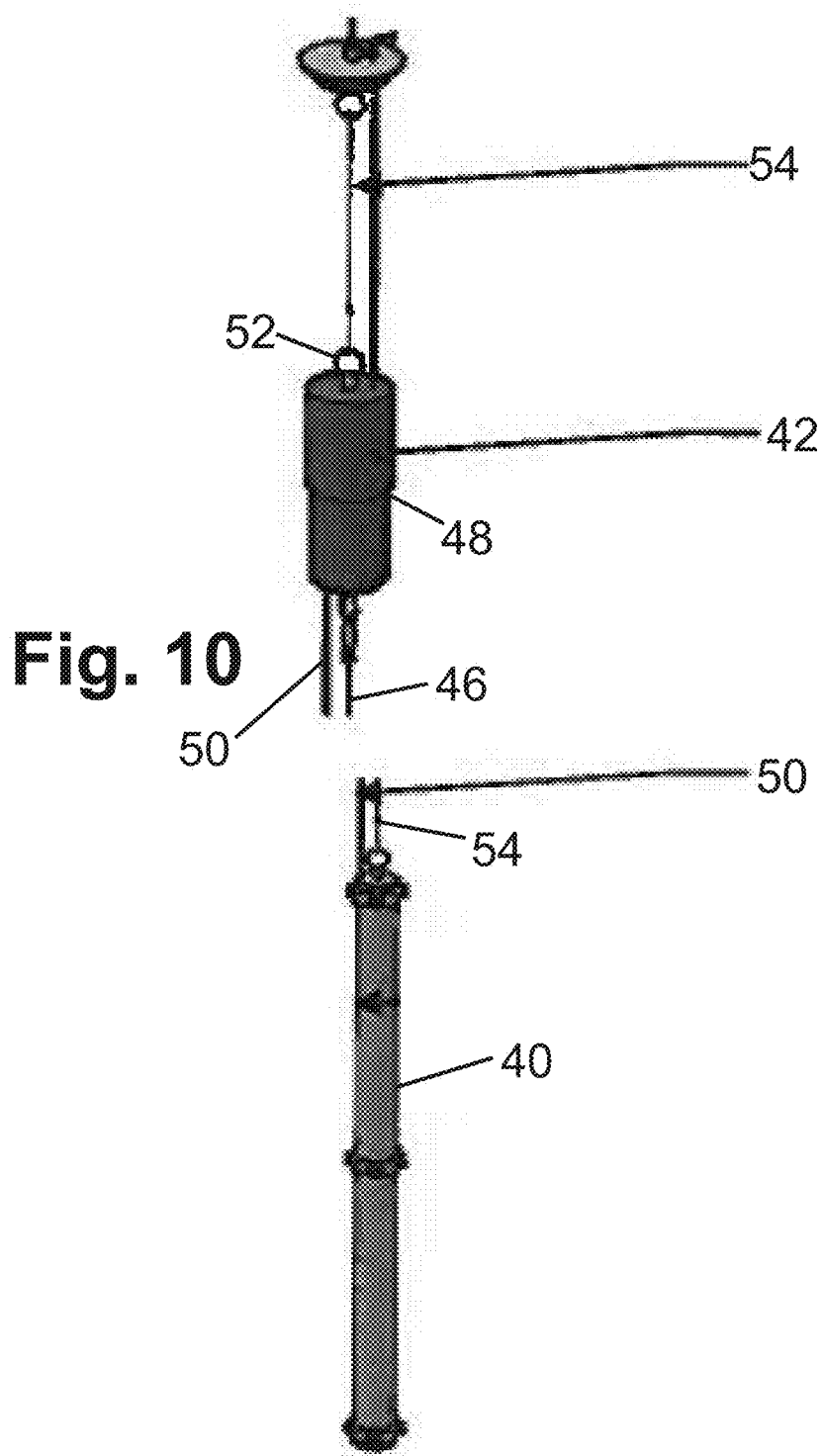

NUCLEAR REACTOR NEUTRON SHIELDING

This invention was made with Government support under Contract No. DE-NE0000583 awarded by the Department of Energy. The Government has certain rights in this invention.

BACKGROUND

The following pertains to the nuclear reactor arts, nuclear power arts, nuclear reactor safety arts, and related arts.

A typical nuclear reactor comprises a radioactive reactor core disposed in coolant in a lower portion of a reactor pressure vessel. For example, a light water reactor employs purified water as the coolant, and the reactor core typically comprises a uranium composition such as uranium oxide ($UO_2$) enriched in the fissile $^{235}U$ isotope. In operation, the nuclear reactor core supports a nuclear chain reaction in which radioactive decay events in the reactor core emit neutrons that stimulate additional decay events in the reactor core. The nuclear chain reaction generates heat that transfers to the coolant. In a boiling water reactor (BWR) design, heat from the reactor core converts coolant in the reactor pressure vessel to steam that is directly used to drive the turbine of an electrical generation system (or more generally to perform some other useful work). The BWR design has a disadvantage in that the steam piped from the reactor pressure vessel to the turbine has some contaminant radioactivity. In a pressurized water reactor (PWR) design, the coolant in the pressure vessel remains in a liquid state (e.g. subcooled state) and heats feedwater (secondary coolant) that flows through a separate flow path in a steam generator. The feedwater (secondary coolant) is converted to steam by heat transfer from the (primary) coolant of the reactor pressure vessel, thus providing steam for driving a turbine or performing other useful work that is free from contaminant radioactivity. In conventional PWR designs, the steam generator is separate from the nuclear reactor, and a (primary) coolant loop comprising large diameter piping flows primary coolant between the reactor pressure vessel and the separate steam generator (or generators). By contrast, in so-called "integral" PWR designs, the steam generator is located inside the reactor pressure vessel and feedwater is piped into the steam generator through suitable vessel penetrations. Advantageously, the integral PWR design avoids flowing primary coolant with its contaminant radioactivity through external large-diameter piping, and typical integral PWR designs reduce the diameter and number of vessel penetrations overall.

In all such designs, the nuclear chain reaction in the reactor core generates high concentrations of neutrons in the reactor core. In a thermal nuclear reactor, the coolant also serves as a neutron moderator in order to thermalize neutrons to lower energies that are more effective for stimulating fissile isotope radioactive decay events. Neutron reflectors are typically disposed around the nuclear reactor core in order to retain a higher concentration of neutrons in the core. The neutron reflectors also serve to greatly reduce the neutron concentration outside the reactor pressure vessel. For example, in some designs it is expected that the neutron concentration external to the lower portion of the reactor pressure vessel (that is, proximate to the reactor core) is of order 100,000 lower than the concentration inside the reactor core.

BRIEF SUMMARY

In some embodiments described herein as illustrative examples, a nuclear reactor includes a reactor pressure vessel and a nuclear reactor core comprising fissile material disposed in a lower portion of the reactor pressure vessel. The lower portion of the reactor pressure vessel is disposed in a reactor cavity. An annular neutron stop is located at an elevation above the uppermost elevation of the nuclear reactor core. The annular neutron stop comprises neutron absorbing material filling an annular gap between the reactor pressure vessel and the wall of the reactor cavity.

In some additional embodiments the annular neutron stop comprises an outer neutron stop ring attached to the wall of the reactor cavity, and an inner neutron stop ring attached to the reactor pressure vessel. In some such embodiments the inner neutron stop ring comprises a high temperature neutron absorbing material that is stable at an exterior temperature of the reactor pressure vessel during nuclear reactor operation, and the outer neutron stop ring comprises a neutron absorbing material that is different from the high temperature neutron absorbing material. In other embodiments the neutron absorbing materials are the same.

In a more specific embodiment, the outer neutron stop ring includes: (i) an outermost neutron stop ring attached to the wall of the reactor cavity and comprising the neutron absorbing material that is different from the high temperature neutron absorbing material, and (ii) a middle neutron stop ring attached to the outermost neutron stop ring and comprising the high temperature neutron absorbing material.

In some further embodiments described herein as illustrative examples, an apparatus as described in the immediately preceding paragraph further comprises a tube penetrating through the annular neutron stop, and a neutron plug disposed in the tube at the penetration of the tube through the neutron stop. The neutron plug comprises neutron absorbing material. The tube may comprise an excore instrument guide tube, and the apparatus may further comprise an excore instrument suspended from the neutron plug by a cable.

In some still additional embodiments described herein as illustrative examples, a method comprises: disposing a lower portion of a nuclear reactor including a nuclear reactor core in a reactor cavity; generating a neutron field by operating the nuclear reactor; and retaining the neutron field in the reactor cavity. In some further embodiments the retaining comprises retaining the neutron field in the reactor cavity using an annular neutron stop located at an elevation above the nuclear reactor core.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

FIG. 10 diagrammatically shows an isolation perspective view of the neutron plug of FIGS. 7-9 in combination with a lifting cable arrangement suitable for loading the excore instrument into the guide tube.

FIG. 11 diagrammatically shows a perspective view of the lifting system of FIG. 10 in the context of the guide tube.

DETAILED DESCRIPTION OF THE PREFERRED EMBODIMENTS

Figure 1:
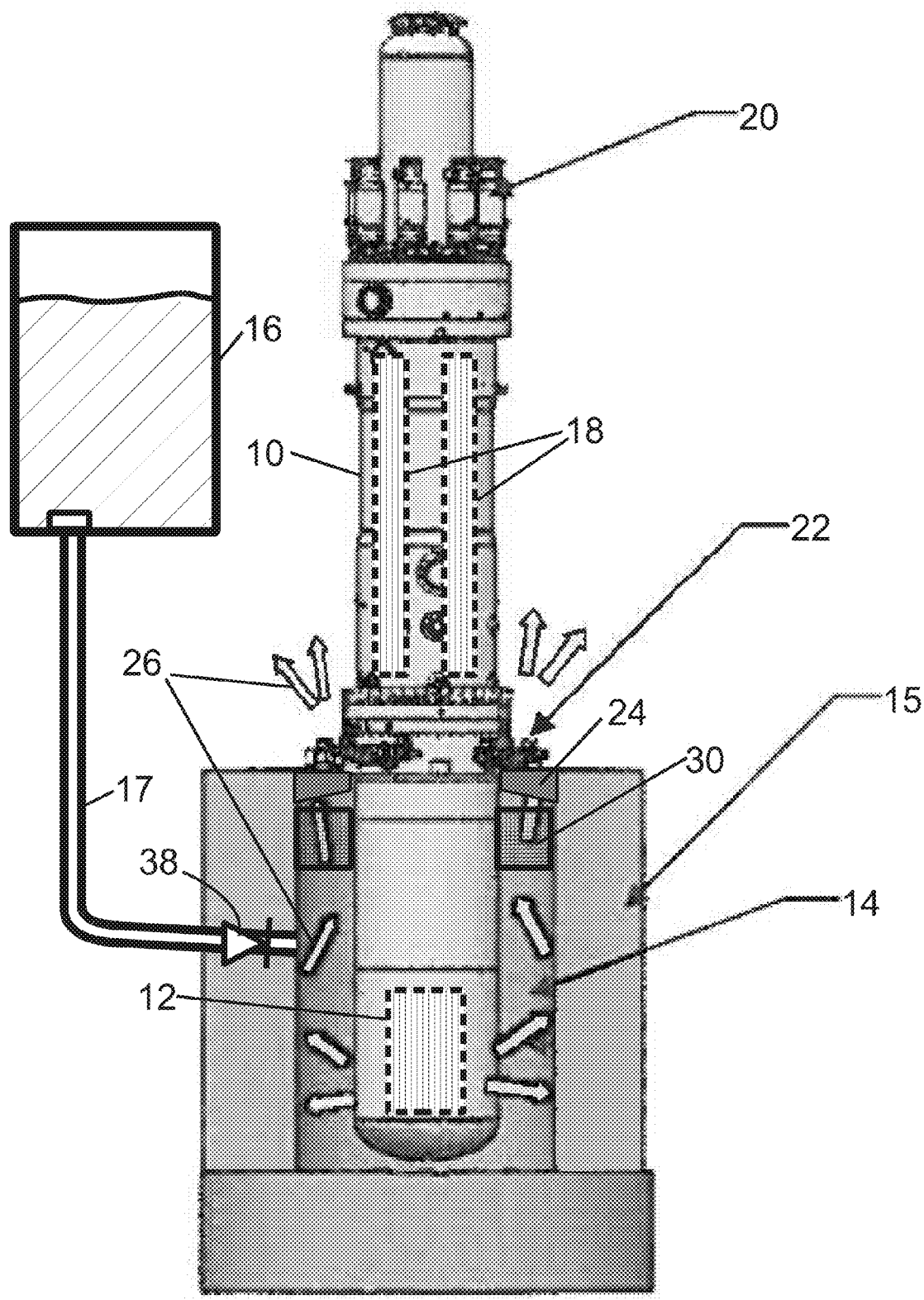
FIG. 1 diagrammatically shows a side view of a small modular nuclear reactor (SMR) disposed in a reactor cavity, with the reactor cavity shown in partial cutaway to reveal components inside including the lower portion of the reactor pressure vessel and an illustrative neutron stop as disclosed herein. Neutron flow paths are diagrammatically indicated in FIG. 1 by arrows.

With reference to FIG. 1, a nuclear reactor includes a reactor pressure vessel 10 containing a nuclear reactor core 12. In diagrammatic FIG. 1, the location of the nuclear reactor core 12 inside the pressure vessel 10 is diagrammatically indicated, but it is to be understood that because the nuclear reactor core 12 is disposed inside the pressure vessel 10 it is not visible externally. The nuclear reactor core 12 is more particularly disposed in a lower portion of the reactor pressure vessel 10, which has the advantage that a loss of coolant accident (LOCA) is less likely to result in uncovering of the reactor core 12. Air exposure of the reactor core 12 is generally problematic as it can lead to deleterious air/core material reactions, melting of fuel rods, and so forth.

To further reduce the likelihood of the reactor core 12 becoming uncovered, that is, exposed to air, the lower portion of the reactor pressure vessel 10 that contains the reactor core 12 is disposed in a reactor cavity 14 defined by a reactor cavity structure 15. In some embodiments, the reactor cavity structure 15 comprises a concrete (possibly steel-reinforced concrete) floor of a surrounding radiological containment structure (not shown). In the event of a LOCA, the reactor cavity 14 is suitably flooded with water, for example from a refueling water storage tank (RWST) 16 located inside the radiological containment via suitable piping 17. The RWST 16 is also used as a water source during refueling (that is, during replacement of some or all fuel assemblies that make up the reactor core 12). As further illustrative examples, the water source for flooding the reactor cavity 14 may be supplied from outside radiological containment, and/or may include (primary) reactor coolant that escapes from the reactor pressure vessel 10 into the radiological containment structure via the LOCA break. (Such coolant typically escapes the pressure vessel 10 in the form of steam or a steam/water mixture, which can be condensed and channeled into the reactor cavity 14 by suitable condensers, gutters, or the like located inside the radiological containment).

The illustrative nuclear reactor is of the integral pressurized water reactor (integral PWR) variety, and further includes one or more internal steam generators 18 disposed inside an upper portion of the reactor pressure vessel 10, and reactor coolant pumps (RCPs) 20 mounted on the upper portion of the reactor pressure vessel 10. Like the nuclear reactor core 12, it is to be understood that the diagrammatically indicated steam generators 18 are disposed inside the pressure vessel 10 and hence are not actually visible externally. In the illustrative integral PWR, integral isolation valves (IIVs) 22 are employed at vessel penetrations, for example to inject feedwater into the steam generators 18 and to extract steam from the steam generators 18. The illustrative integral PWR is mounted in suspended fashion from at or near the top of the reactor cavity 14 via reactor support brackets, corbels or the like 24; alternatively, the integral PWR may be bottom-supported by a suitable support at the bottom of the reactor cavity 14. The illustrative integral PWR is an example, and the neutron stops and related subject matter disclosed herein are readily employed in conjunction with other types of nuclear reactors, such as PWR designs with external steam generators, with boiling water reactor (BWR) designs, and so forth.

With continuing reference to FIG. 1, as previously mentioned neutron reflectors are typically disposed around the nuclear reactor core in order to retain a higher concentration of neutrons in the core, and the neutron reflectors also serve to greatly reduce the neutron concentration outside the reactor pressure vessel. Nonetheless, the neutron field generated by the reactor core 12 extends into the reactor cavity 14 outside of the reactor pressure vessel 10. During normal reactor operation, this region is not occupied by operations personnel, and does not contain radiation-sensitive equipment. Thus, the concentration of neutrons in the reactor cavity 14 outside of the reactor pressure vessel 10 may not be, in and of itself, problematic.

However, as disclosed herein and as diagrammatically shown by arrows 26 in FIG. 1, a significant neutron field extends upward above the reactor cavity 14. Due to the reflectivity of neutrons, a substantial fraction of the neutrons that escape from the reactor vessel into the reactor cavity 14 scatter in the air, ricochet off of the inside walls of the reactor cavity 14 and travel generally upward to exit the top of the reactor cavity 14. In the illustrative integral PWR of FIG. 1, this exposes the reactor coolant pump (RCPs) 20 and the integral isolation valve (IIV) units 22 to high neutron densities, which can be problematic if these components are sensitive to neutron exposure, or even if these components are not rated for the neutron field level generated by this effect. While for the illustrative integral PWR exposure of the illustrative components 20, 22 is of concern, more generally a nuclear reactor tends to have potentially radiation-sensitive components such as electronics, components including polymer materials, or so forth located above the reactor cavity. Additionally, operations personnel may perform operations in this region, leading to undesirable human exposure to relatively high neutron radiation.

Figure 2:
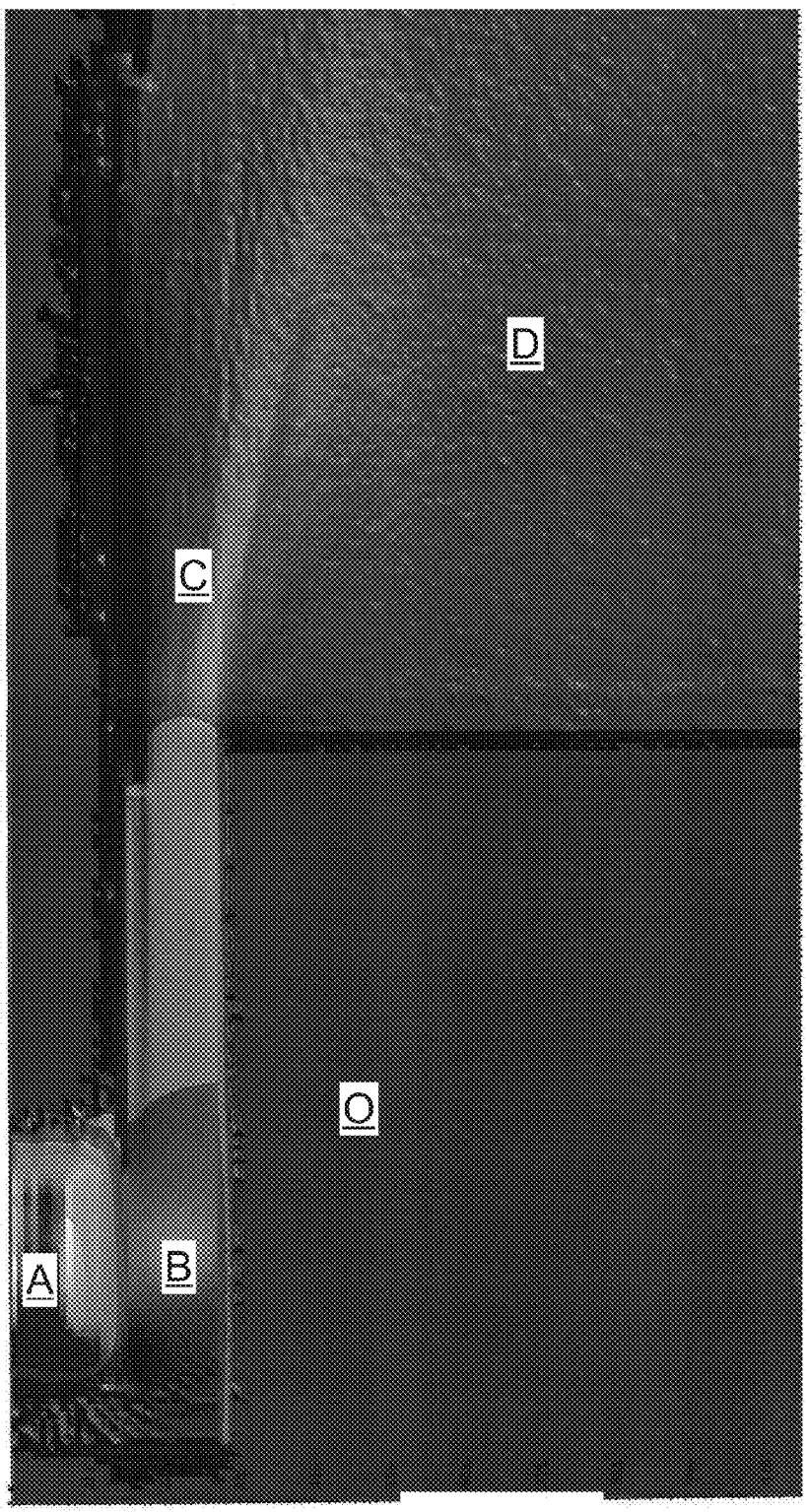
FIG. 2 plots simulated neutron concentration in an SMR of the type shown in FIG. 1, but with the neutron stop omitted.

With reference to FIG. 2, this effect of neutrons escaping upward out of the reactor cavity 14 is illustrated by a neutron field simulation performed for an integral PWR of the type shown in FIG. 1. In FIG. 2, region A corresponds to the nuclear reactor core 12 of FIG. 1, and as the source of the neutron field has the highest neutron density. A region O indicated in FIG. 2 corresponds to the reactor cavity structure 15 of FIG. 1, and is assumed to have a neutron concentration of zero (or a suitably negligible value for the modeling). Based on the neutron field modeling, it is found that the neutron field in a region B corresponding to the portion of the reactor cavity 14 just radially outside the pressure vessel 10 at the same elevation as the nuclear reactor core 12 has a neutron field about five orders of magnitude lower than the neutron concentration in the region A corresponding to the reactor core 12. This is still a relatively high neutron field. As further seen in FIG. 2, the neutron field has decreased by an additional factor of only 100 in a region C located directly above the open upper end of the reactor cavity 14, and in the remaining simulation volume D above the reactor cavity 14 the neutron field has decreased by only a factor of 1000 as compared with the neutron field in the region B. The high neutron field in the regions C, D is attributable to the neutron reflectivity of the steel making up the reactor pressure vessel 10 and of the concrete making up the reactor cavity structure 15, which combine to channel neutrons generally upward and into the regions C, D.

In sum, it is recognized herein that the high neutron emissions of the reactor core 12 in combination with the reflective properties of neutrons and the presence of the reactor cavity 14 (which is typically required to ensure continued immersion of the reactor core 12 in the event of a LOCA) combine to channel neutrons generally upward into upper regions of radiological containment where sensitive equipment or operations personnel may be present. On the other hand, the reactor cavity structure 15 is typically a thick structure made principally of concrete, which prevents the passage of neutrons laterally or downward. Neutrons traveling inside the reactor pressure vessel 10 are typically thermalized by the coolant, so that this is also not a significant pathway for neutrons to escape upward.

With returning reference to FIG. 1, it is disclosed herein that in view of the foregoing a sufficient neutron barrier is provided by an annular neutron stop 30 located in an upper region of the reactor cavity 14. The annular neutron stop 30 comprises a neutron-absorbing material filling an annular gap between the reactor pressure vessel 10 and the reactor cavity 14, and is effective to block neutrons from passing upward through the neutron stop 30. (It should be understood that the neutrons diagrammatically indicated by arrows 26 in FIG. 1 are provided for expository purpose, and are shown assuming that the neutron stop 30 is not present). The annular neutron stop 30 is located at an elevation that is above the uppermost elevation of the nuclear reactor core 12, that is, above the top of the nuclear reactor core 12. The annular neutron stop 30 is a ring of neutron shielding material that fills the annular gap between the reactor vessel 10 and the (inside) wall of the reactor cavity 14. The annular neutron stop 30 can be a continuous ring of shielding material, or made from segmented portions for installation purposes.

Figure 3:
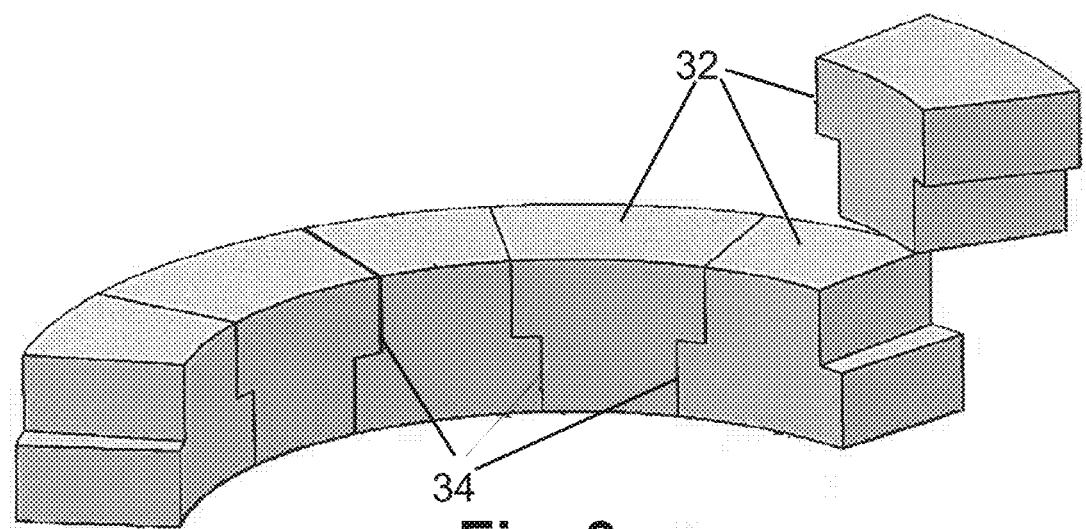
FIG. 3 diagrammatically shows a perspective view of a portion of a suitable embodiment of the neutron stop of FIG. 1.

With reference to FIG. 3, an example of a segmented embodiment is shown. The neutron stop 30 of FIG. 3 is assembled along the circumferential direction of blocks 32 of neutron-absorbing material. The joinder of each pair of neighboring blocks 32 preferably includes a stair-stepped or staggered interface 34 which eliminates direct line-of-site passageways so as to block neutrons from streaming through the interfaces 34 between the blocks 32. While the illustrative approach of employing blocks 32 along the circumferential direction is advantageous for assembly convenience, it is also contemplated for the neutron stop to be manufactured as a continuous ring rather than being segmented into blocks 32.

Figure 4:
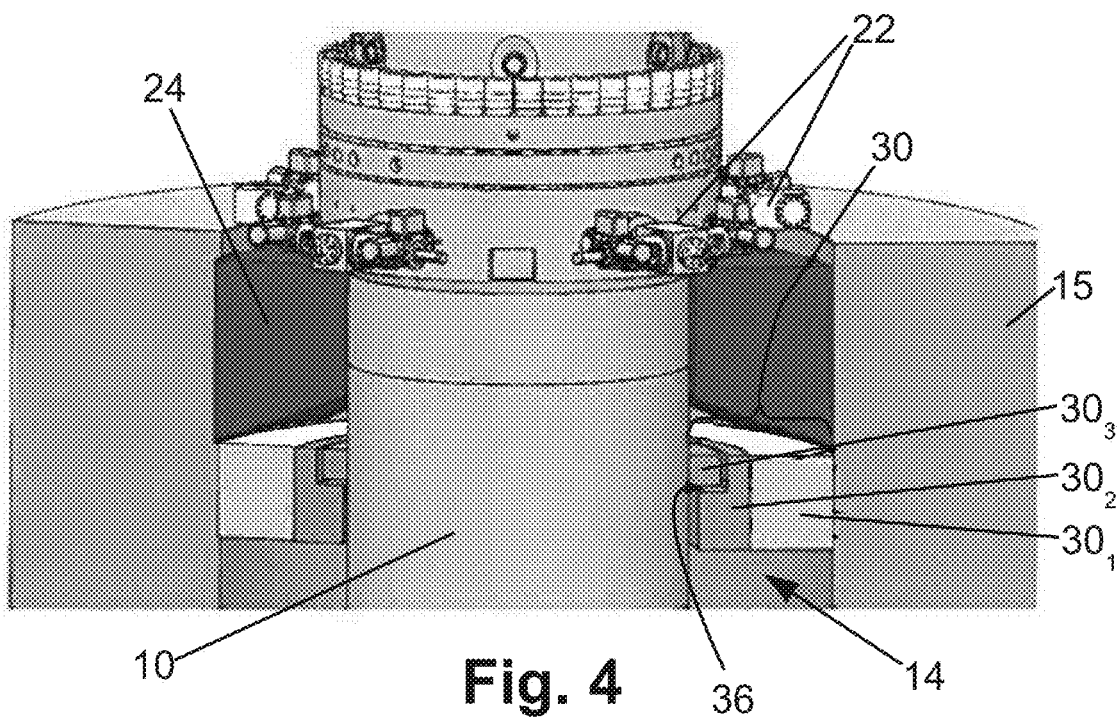
FIG. 4 diagrammatically shows a perspective view of the SMR of FIG. 1 disposed in the reactor cavity, again shown in partial cutaway, with details of an illustrative embodiment of the neutron stop as disclosed herein.

With reference to FIG. 4, radial thermal expansion of the reactor pressure vessel 10 and radial expansion from interior pressure is expected to occur as the nuclear reactor is transitioned from standby into operation. Additionally, a large thermal gradient is present as the portion of the neutron stop 30 proximate to the reactor pressure vessel 10 is exposed to higher temperature as compared with the outboard portion of the neutron stop 30 that is proximate to the wall of the reactor cavity 14. One approach for accommodating these factors is illustrated in FIG. 4, where the neutron stop 30 is constructed as three component rings: an outermost neutron stop ring $30_1$ that is secured to the wall of the reactor cavity 14; a middle neutron stop ring $30_2$ located inboard of and secured to the neutron stop ring $30_1$; and an innermost neutron stop ring $30_3$ that is secured to the exterior of the reactor pressure vessel 10. Each component neutron stop ring $30_1$, $30_2$, $30_3$ may be constructed along the circumferential direction using the illustrative blocks 32 with stair-stepped or staggered interfaces 34 between the blocks, as described with reference to FIG. 3. This same staggering may optionally exist as between the radial interface of the component rings. Additionally, an interface 36 between the middle and innermost neutron stop rings $30_2$, $30_3$ may be stair-stepped or staggered as shown in FIG. 4, to block neutrons from streaming through the interface 36 between the middle and innermost neutron stop rings $30_2$, $30_3$. In illustrative FIG. 4 this is obtained by including a cutout portion in the middle neutron stop ring $30_2$ into and over which is disposed the innermost neutron stop ring $30_3$. The interface between the outermost and middle neutron stop rings $30_1$, $30_2$ is not staggered in the illustrative example of FIG. 4, because the middle neutron stop ring $30_2$ is bonded directly to the outermost neutron stop ring $30_1$ with no air gap; however, it is also contemplated to employ a stair-stepped or staggered interface between the outermost and middle neutron stop rings. The blocks 32 that form the innermost neutron stop ring $30_3$ are suitably attached to the exterior of the reactor pressure vessel 10 by welding, fasteners (e.g. bolts) or are held onto the vessel 10 with band straps. The innermost neutron stop ring $30_3$ is allowed to grow radially with the reactor. To accommodate this, the interface 36 should have a sufficient air gap to accommodate differential thermal expansion, that is, to accommodate the outward expansion of the innermost stop ring $30_3$ as the reactor pressure vessel 10 is heated to its operational temperature.

Because the innermost neutron stop ring $30_3$ is in contact with the reactor pressure vessel 10, it is exposed to heat emanating from the operating nuclear reactor via radiative, conductive and conductive thermal transfer pathways. This can be accommodated by containing the neutron shielding material of the innermost neutron stop ring $30_3$ within an outer can comprising stainless steel or another suitably heat resistant structural material. In this case, the neutron-absorbing material does not need to be self-supporting or be of structural material. The outboard portion comprising the middle neutron stop ring $30_2$ and outermost neutron stop ring $30_1$ is exposed to lower temperature, but there is a substantial temperature gradient. This is accommodated by constructing the outboard portion of the neutron stop using two rings: the middle neutron stop ring $30_2$ and the outermost stop ring $30_1$. This construction allows the middle neutron stop ring $30_2$ to be made of relatively more heat resistant material as compared with the outermost neutron stop ring $30_1$. In some embodiments, both the innermost neutron stop ring $30_3$ and the middle neutron stop ring $30_2$ are made of the same material, while the outermost neutron stop ring $30_1$ is made of a less heat resistant material that may be of lower cost and/or improved structural strength.

The neutron stop rings $30_1$, $30_2$, $30_3$ are suitably made of neutron-absorbing material that also has appropriate thermal insulation characteristics so that the neutron stop ring 30 does not act as a thermal shunt. It is also recognized herein that it is advantageous for the neutron stop material to include a neutron moderator material so as to thermalize neutrons which increases effectiveness of the neutron absorber. Some suitable materials are composite materials including a boron-containing neutron absorber component, a component including carbon and/or hydrogen which acts as a neutron moderator, and a thermally insulating matrix material.

For the high temperature material of the inner neutron stop rings $30_2$, $30_3$, some suitable compositions include boron carbide ($B_4C$) powder as the neutron absorber, disposed in a vermiculite matrix which provides both neutron moderator and thermal insulator characteristics. Vermiculite is a hydrous silicate mineral material, and the hydrogen provides neutron moderation. Serpentine is another hydrous thermally insulating material that may be substituted for vermiculite. As already noted, this material may be contained within an outer can comprising stainless steel or another suitably heat resistant structural material.

The outermost neutron stop ring $30_1$ is suitably made of borated concrete of suitably high density, optionally infused with hydrogen to enhance its neutron moderator characteristics. Since the outermost neutron stop ring $30_1$ is structural and indeed supports the middle neutron stop ring $30_2$ in a cantilevered fashion, it is contemplated for the borated concrete to be steel-reinforced or otherwise structurally reinforced. In another suitable embodiment, the outermost neutron stop ring $30_1$ is made of borated polyethylene, which is advantageously lighter in weight as compared with concrete.

The annular neutron stop 30 is located at an elevation that is above the uppermost elevation of the nuclear reactor core 12, and comprises neutron absorbing material that fills the annular gap between the reactor pressure vessel 10 and the reactor cavity 14. The annular neutron stop 30 is thus positioned to block neutrons from passing upward through the annular gap between the reactor pressure vessel 10 and the reactor cavity 14 and out into the space above the reactor cavity 14 which may be occupied by neutron radiation-sensitive equipment such as the RCPs 20 or IIV's 22, and/or which may be occupied by operational personnel.

Figure 5:
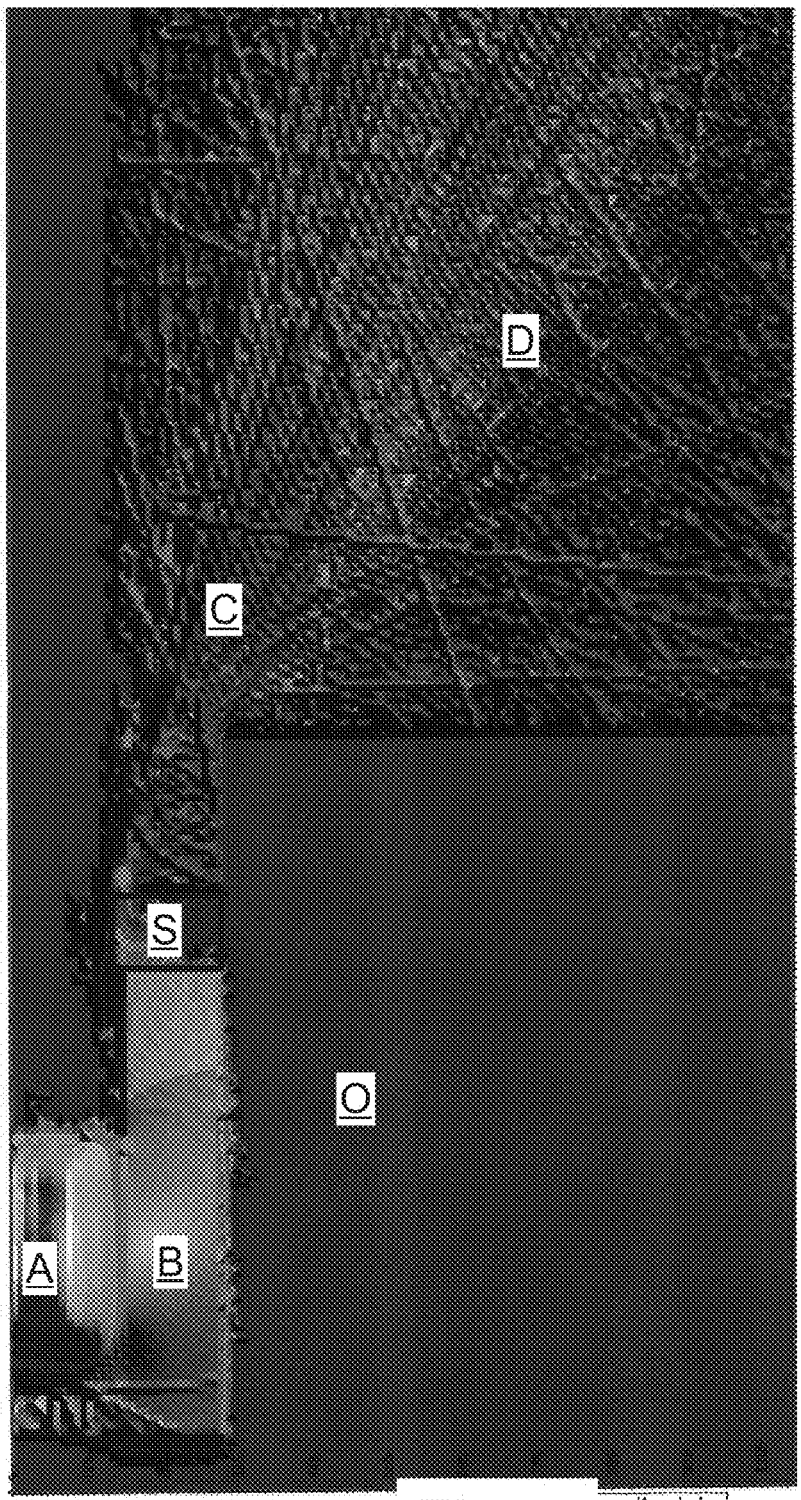
FIGS. 5 and 6 plot simulated neutron concentration in an SMR of the type shown in FIGS. 1 and 3 for two illustrative embodiments of the neutron stop.
Figure 6:
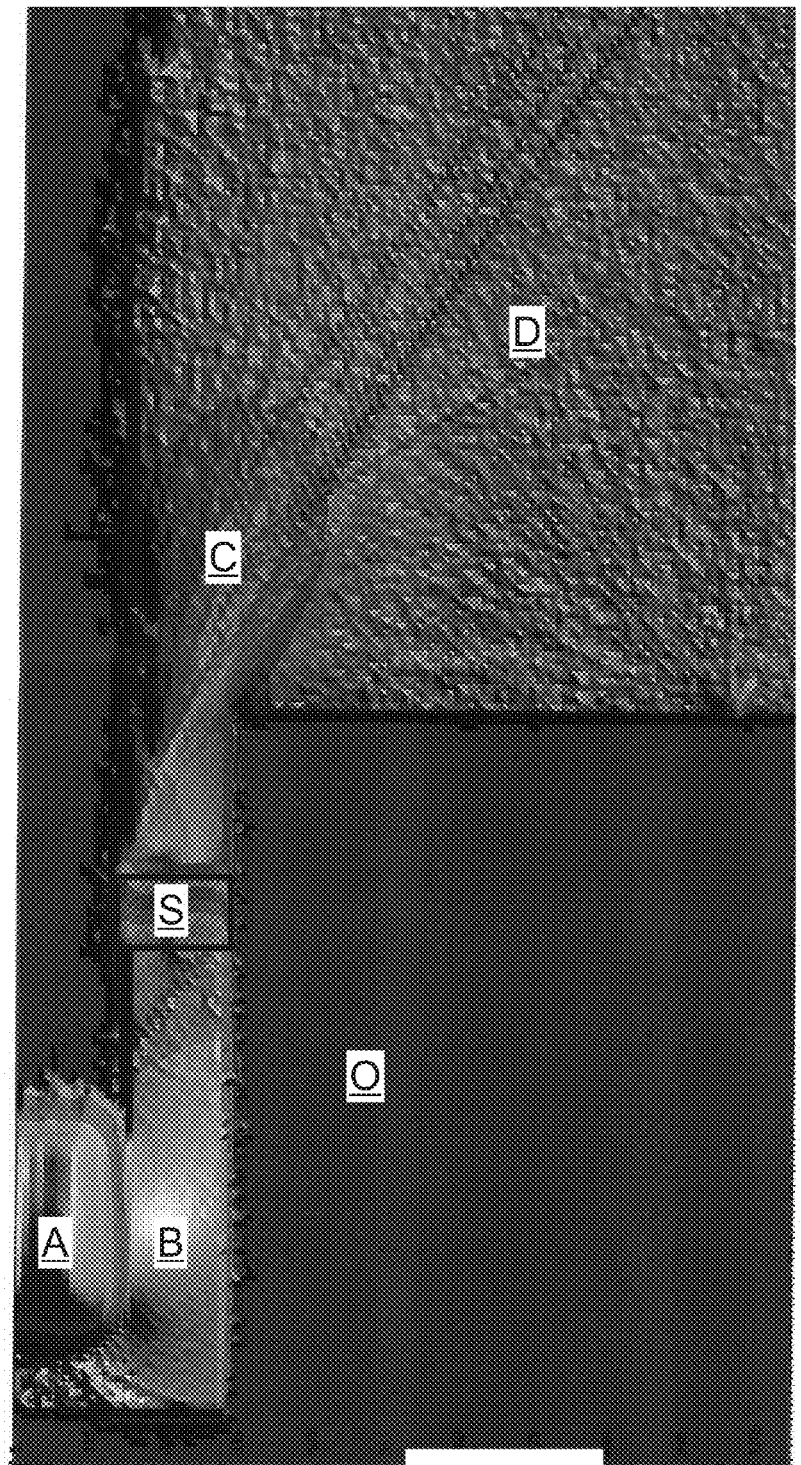

With reference to FIGS. 5 and 6, the reduction in neutrons escaping upward out of the reactor cavity 14 achieved by use of the disclosed neutron stop 30 is illustrated by neutron field simulations similar to that of FIG. 2, but now including simulated embodiments of the neutron stop 30 in a region S indicated in FIGS. 5 and 6. In FIG. 5 the simulated neutron stop includes: (i) an inner ring of a high temperature neutron-absorbing composite comprising 50-vol % $B_4C$, 25-vol % vermiculite, and 25 vol-% air (modeling the impact of air pockets or the like in the composite material); and (ii) an outer ring of borated polyethylene. In FIG. 6, the simulated neutron stop includes: (i) an inner ring of 50-vol % $B_4C$ and 50-vol % air (modeling an inner ring comprising boron carbide powder in a steel encasement); and (ii) an outer ring of borated concrete. It is seen in FIGS. 5 and 6 that the neutron field in the reactor core 12 (that is, in region A) and in the region B corresponding to the portion of the reactor cavity 14 just radially outside the pressure vessel 10 at the same elevation as the nuclear reactor core 12 are not significantly affected by the presence of the simulated neutron stop 30. Note that in FIGS. 5 and 6 the region B is located below the region S of the simulated neutron stop.

By contrast, the neutron field in the regions C, D located above the top of the reactor cavity 14 (and hence above the region S of the simulated neutron stop in the simulations of FIGS. 5 and 6) is greatly reduced as compared with the simulation of FIG. 2 which does not simulate the neutron stop 30. In the region C directly above the reactor cavity 14, the neutron field is reduced by a factor of $10^6$ (that is, by a factor of one million) in the simulations of FIGS. 5 and 6 as compared with the simulation of FIG. 2. In the simulation volume D the neutron field has again decreased by a factor of $10^6$ (that is, by a factor of one million) in the simulations of FIGS. 5 and 6 as compared with the simulation of FIG. 2.

It should be noted that the simulated neutron stops of FIGS. 5 and 6 do not account for the detailed construction of the illustrative neutron stop 30, but rather model the two high-temperature neutron stop rings $30_2$, $30_3$ as a single ring of high temperature material. In particular, the simulations of FIGS. 5 and 6 do not model the air gap 36. However, the air gap 36 is at its smallest extent during normal operation of the integral PWR since during normal operation the reactor pressure vessel 10 is at temperature and hence maximally thermally expanded outward.

As a further mechanism for reducing the neutron field in the reactor cavity 14, it is contemplated to line the reactor cavity walls with a surface layer of borated (and optionally hydrogen-infused) concrete. (This optional aspect is not incorporated into the simulations of FIGS. 2, 5, and 6).

The neutron stop ring 30 should be designed so as to not impede operation of the reactor cavity 14. For example, the neutron stop 30 should not impede flooding of the reactor cavity 14 during a LOCA. Advantageously, piping 17 extending between the reactor cavity 14 and the RWST 16 is not expected to be a substantial neutron leak source since neutrons channeled into the RWST 16 by the piping 17 are expected to be removed by water in the RWST 16; nonetheless, if desired a neutron-absorbing check valve 38 (see FIG. 1) may be provided within the portion of the pipe 17 passing through the concrete wall of the reactor cavity 14 to block neutron leakage via pipe 17. In a suitable embodiment, the check valve 38 can comprise a conventional swing check valve allowing flow only in the direction into the reactor cavity 14, in which the valve disk comprises a neutron absorbing material such as a material comprising a boron compound and an optional neutron moderator material. The discharge end of the piping 17 should output into the reactor cavity 14 at an elevation that is below the elevation of the neutron stop 30. Condensed steam from the LOCA break can be channeled into the reactor cavity 14 via the staggered gap 36 between the neutron stop rings $30_2$, $30_3$. Another consideration is the potential for water flooding into the reactor cavity 14 to evaporate and form steam, potentially leading to a rise in pressure. This also can be accommodated by the staggered air gap 36 between the neutron stop rings $30_2$, $30_3$, which serves as a steam vent.

Figure 7:
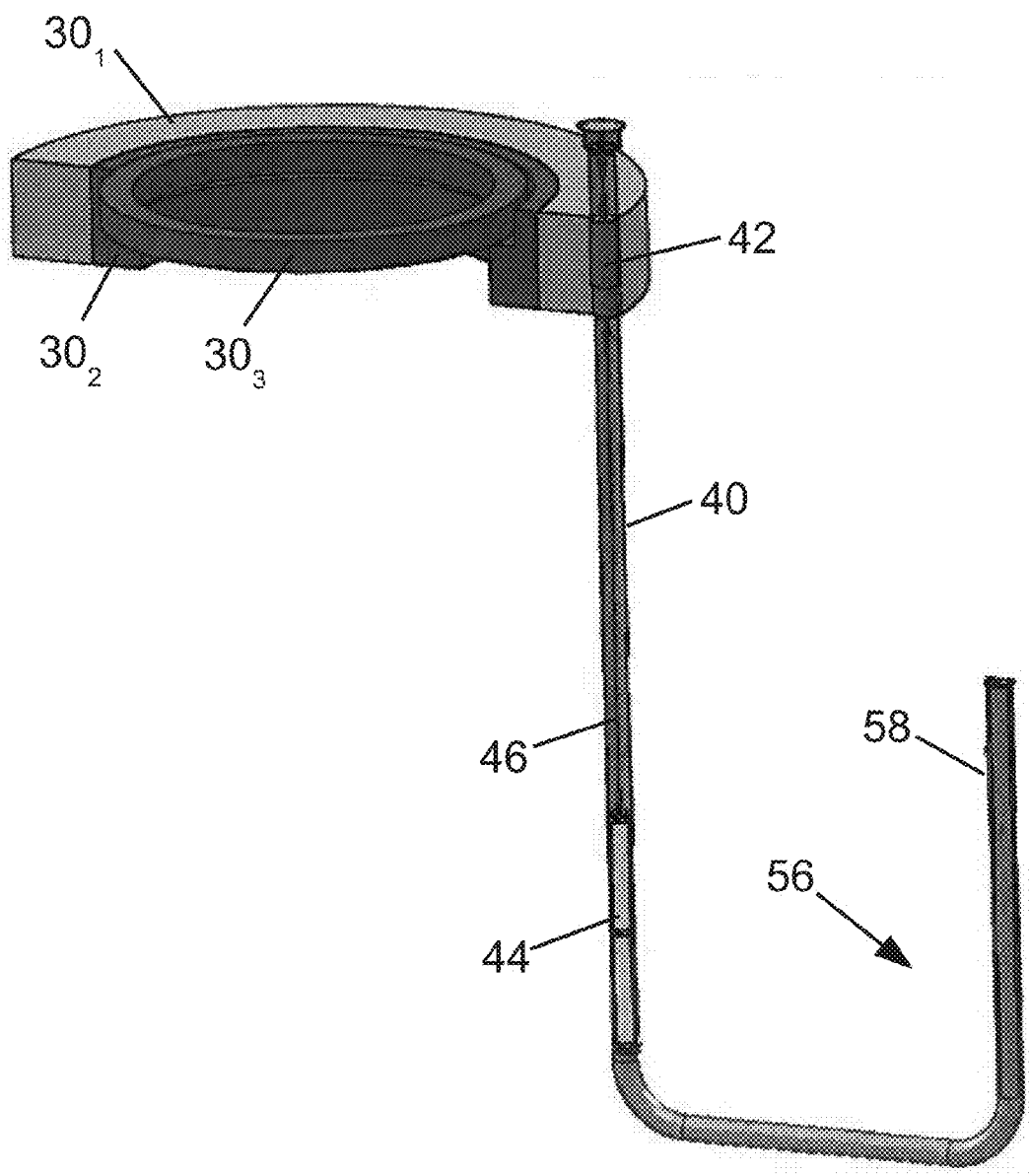
FIG. 7 diagrammatically shows a perspective view of an excore instrument guide tube in partial cutaway to reveal a neutron plug as disclosed herein.

With reference to FIG. 7, excore instrument guide tubes, such as the illustrative excore guide tube 40, present another potential neutron leak. Excores are instrumentation that monitors aspects such as the power distribution of the reactor. The excore guide tubes 40 are located beyond the radial profile of the reactor vessel, and as seen in FIG. 7 may be arranged to pass through the neutron stop ring 30 (and more particularly the outermost neutron stop ring $30_1$ in FIG. 7). The guide tube 40 allows for the excore detector instrument to be lowered into the reactor cavity to an elevation equal to the height of the core. Due to the requirement to monitor power levels of quadrants of the core, the excores are clocked at specific locations within the reactor cavity, and accordingly their location may be difficult or impossible to alter in a given nuclear reactor design.

Figure 8:
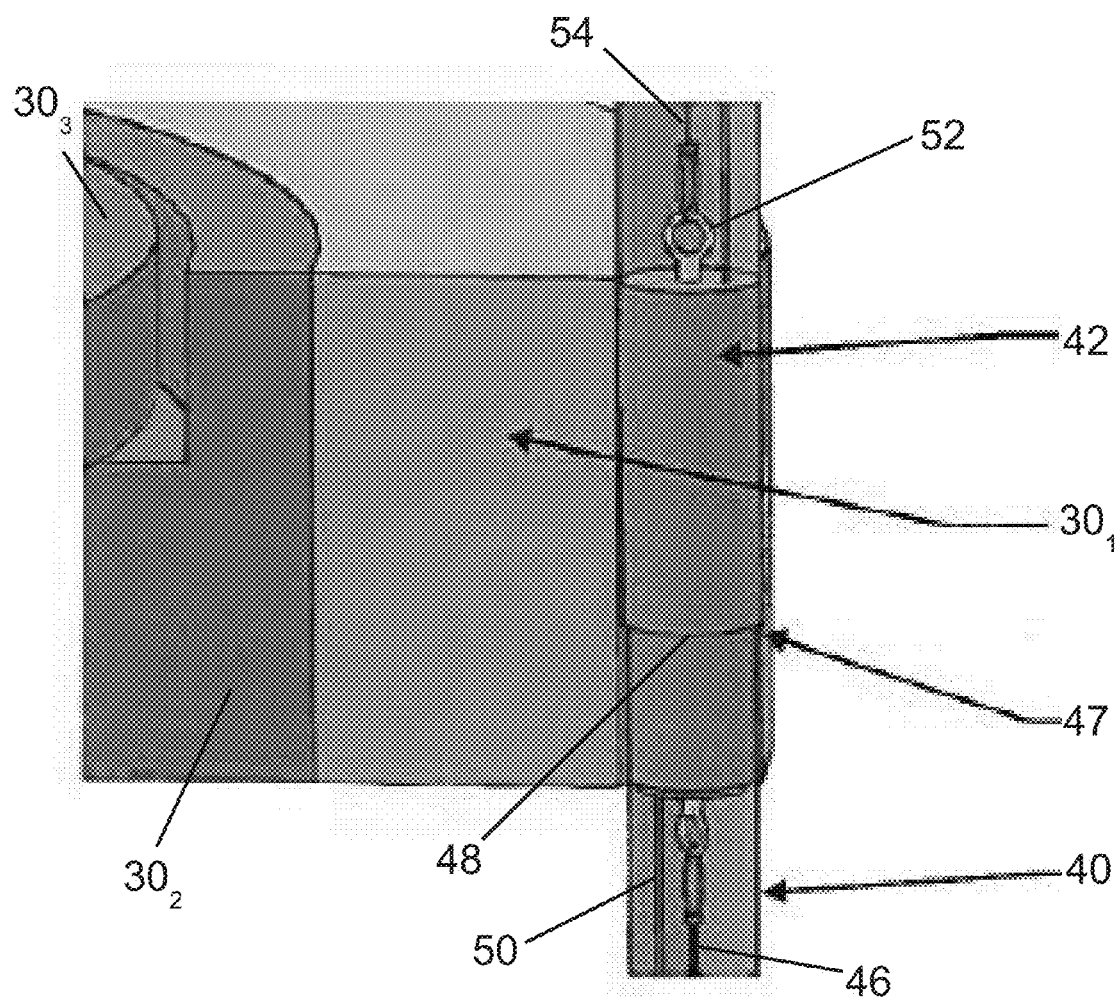
FIG. 8 diagrammatically shows an enlarged perspective view of the excore instrument guide tube of FIG. 7 focusing on the neutron plug.
Figure 9:
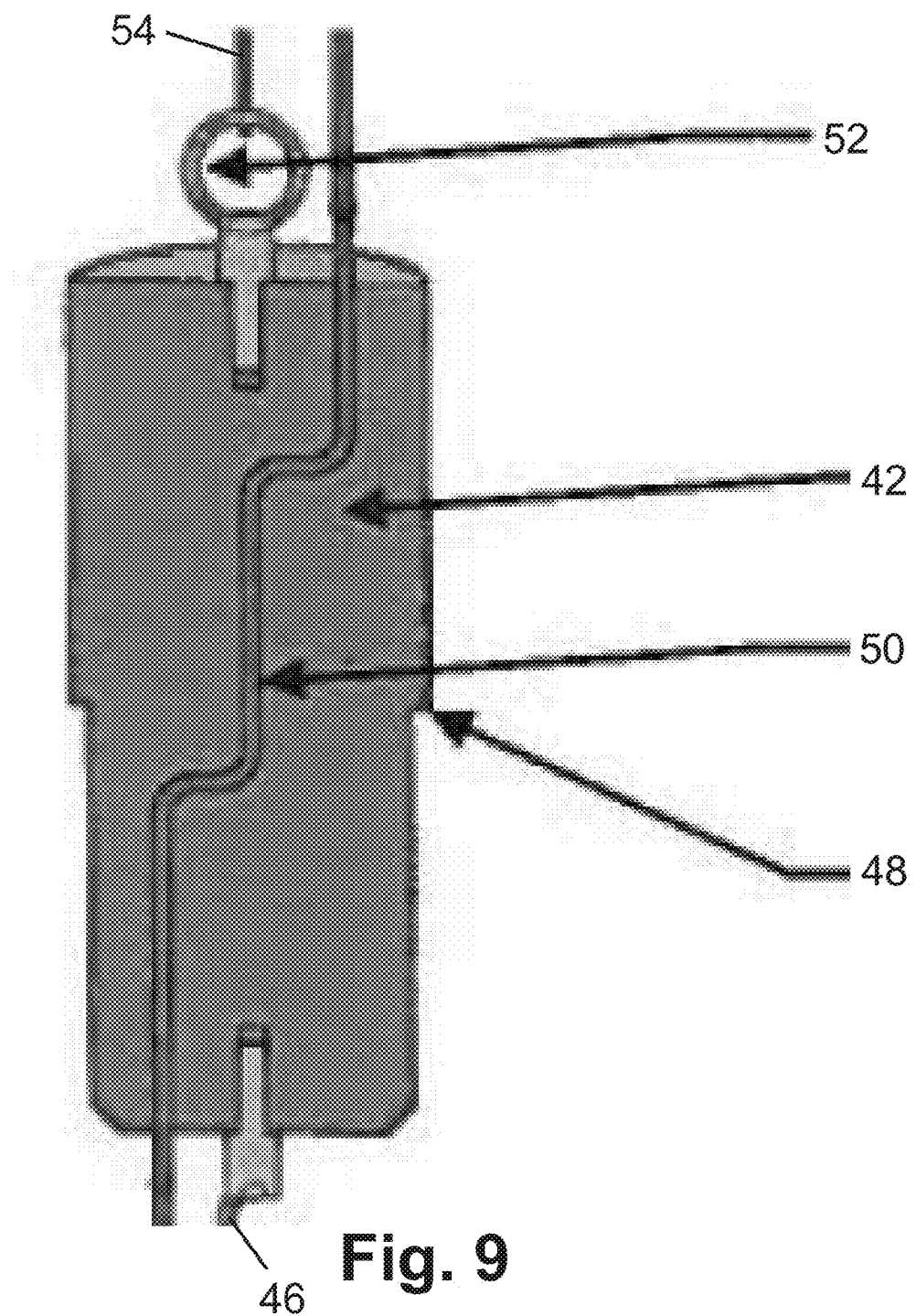
FIG. 9 diagrammatically shows a cutaway view of the neutron plug of FIGS. 7 and 8.

With continuing reference to FIG. 7 and with further reference to FIGS. 8 and 9, a neutron plug 42 is provided at the penetration of the guide tube 40 through the neutron stop 30 in order to block neutrons from leaking through that penetration. An excore instrument 44 is suspended from the neutron plug 42 by a cable 46 whose upper end is connected to the bottom of the neutron plug 42. The neutron plug 42 is made of a suitable neutron-absorbing material, and in some embodiments may be made of the same material as the neutron stop through which the guide tube 40 penetrates. In the illustrative example, the guide tube 40 includes a protrusion or ledge 47 that engages a corresponding step 48 on the neutron plug 42 so that the neutron plug 42 rests on the protrusion or ledge 47 to keep it at the desired elevation corresponding to the penetration through the neutron stop 30. Additionally, the larger diameter of the neutron plug 42 above the step 48 blocks neutrons that might otherwise pass through the gap between the smaller diameter of the neutron plug 42 and the larger diameter of the excore guide tube 40.

An electrical wire or wire bundle (or electrical cable, et cetera) 50 carries signals and/or power to/from the excore instrument 44. As seen in the cutaway view of the neutron plug 42 shown in FIG. 9, to allow the wire(s) 50 to pass through the neutron plug 42 without presenting a neutron leakage path, the wires(s) 50 pass through a torturous path through the neutron plug 42 that does not allow neutrons to bypass the shielding material of the neutron plug 42 and pass through the electrical cable 50. The passage of the wire(s) through the tortuous path of the neutron plug 42 can be achieved by forming a tortuous conduit and then passing the wire(s) 50 though the conduit. This allows the wire(s) 50 to be a continuous length passing through the neutron plug 42 and extending above and below it. In an alternative approach, the neutron plug 42 is formed by overmolding over a length of wire(s), and the wires above and below the neutron plug are then soldered or otherwise connected to the ends of the length of wire(s) molded into the neutron plug.

With continuing reference to FIGS. 7-9 and with further reference to FIGS. 10 and 11, in the illustrative embodiment a lifting eye 52 is located at the top of the neutron plug 42. As best seen in FIG. 10, the lifting eye 52 can be connected to a lifting cable 54 so that the assembly can be raised and lowered inside the guide tube 40. FIG. 11 shows the lifting configuration in the context of the guide tube 40.

With reference back to FIG. 7, in some embodiments the excore guide tube 40 may include a portion 56 extending downward and into a basement or other location at which instrument electronics, control, or the like are located. Optionally, an end 58 of this extension is similarly plugged, such as using another instance of the neutron plug 42 (not shown), so as to block neutron leakage into that location via the excore guide tube 40.

While illustrated in the context of a penetration for the illustrative excore guide tube 40 through the neutron stop 30, the illustrative neutron plug 42 is readily modified to block neutron leakage at other types of penetrations through the neutron stop 30, such as for power cables in the case of alternative nuclear reactor designs having reactor coolant pumps located in the reactor cavity.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:

1. An apparatus comprising:
a nuclear reactor including a reactor pressure vessel and a nuclear reactor core comprising fissile material disposed in a lower portion of the reactor pressure vessel;
a reactor cavity inside of which is disposed the lower portion of the reactor pressure vessel, the reactor cavity and a wall of the pressure vessel defining an annular gap therebetween; and
an annular neutron stop located at an elevation above the uppermost elevation of the nuclear reactor core, the annular neutron stop including an outer neutron stop ring including an outermost neutron stop ring attached to the wall of the reactor cavity and a middle neutron stop ring attached to the outermost neutron stop ring, an inner neutron stop ring attached to the reactor pressure vessel and comprising a high temperature neutron absorbing material that is stable at an exterior temperature of the reactor pressure vessel during nuclear reactor operation, and comprising neutron absorbing material filling, the annular neutron stop being disposed in the annular gap between the reactor pressure vessel and a wall of the reactor cavity,
wherein the outer neutron stop ring defines an annular cutout portion in which the inner stop ring is disposed, the middle neutron stop ring comprises the high temperature neutron absorbing material, and the outermost neutron stop ring comprises a neutron absorbing material that is different from the high temperature neutron absorbing material.

2. The apparatus of claim 1 wherein an interface between the outer neutron stop ring and the inner neutron stop ring is stair-stepped or staggered to block neutrons from streaming through the interface.

3. The apparatus of claim 1 wherein the high temperature neutron absorbing material comprises a composition including boron carbide ($B_4C$).

4. The apparatus of claim 1 wherein the neutron absorbing material that is different from the high temperature neutron absorbing material comprises borated concrete.

5. The apparatus of claim 1 wherein the annular neutron stop comprises a boron containing neutron absorber component in a thermally insulating matrix material.

6. The apparatus of claim 5 wherein the thermally insulating matrix material comprises vermiculite.

7. An apparatus comprising:
a nuclear reactor including a reactor pressure vessel and a nuclear reactor core comprising fissile material disposed in a lower portion of the reactor pressure vessel;
a reactor cavity inside of which is disposed the lower portion of the reactor pressure vessel, the reactor cavity and a wall of the pressure vessel defining an annular gap therebetween;
an annular neutron stop located at an elevation above the uppermost elevation of the nuclear reactor core, the annular neutron stop including an outer neutron stop ring defining an annular cutout portion, an inner neutron stop ring disposed in the annular cutout portion, and comprising neutron absorbing material filling, the annular neutron stop being disposed in the annular gap between the reactor pressure vessel and a wall of the reactor cavity;

a tube penetrating through the annular neutron stop; and a neutron plug disposed in the tube at the penetration of the tube through the neutron stop, the neutron plug comprising neutron absorbing material.

8. The apparatus of claim 7 wherein the neutron plug comprises a boron containing neutron absorbing material.

9. The apparatus of claim 7 wherein the tube comprises an excore instrument guide tube and the apparatus further comprises:

an excore instrument suspended from the neutron plug by a cable.

10. The apparatus of claim 9 wherein the neutron plug includes a tortuous path and the apparatus further includes:

one or more wires passing through the tortuous path and operatively connecting with the excore instrument.

11. An apparatus comprising:

a nuclear reactor including a reactor pressure vessel and a nuclear reactor core comprising fissile material disposed in a lower portion of the reactor pressure vessel;

a reactor cavity inside of which is disposed the lower portion of the reactor pressure vessel;

an annular neutron stop located at an elevation above the uppermost elevation of the nuclear reactor core, the annular neutron stop comprising neutron absorbing material filling an annular gap between the reactor pressure vessel and the wall of the reactor cavity;

an excore instrument guide tube penetrating through the annular neutron stop;

a neutron plug including a tortuous path disposed in the excore instrument guide tube at the penetration of the excore instrument guide tube through the neutron stop, the neutron plug comprising neutron absorbing material;

an excore instrument suspended from the neutron plug by a cable; and one or more wires passing through the tortuous path and operatively connecting with the excore instrument.

12. The apparatus of claim 11 wherein the annular neutron stop comprises:

an outer neutron stop ring attached to the wall of the reactor cavity; and an inner neutron stop ring attached to the reactor pressure vessel.

13. The apparatus of claim 12 wherein an interface between the outer neutron stop ring and the inner neutron stop ring is stair-stepped or staggered to block neutrons from streaming through the interface.

14. The apparatus of claim 12 wherein the inner neutron stop ring comprises a high temperature neutron absorbing material that is stable at an exterior temperature of the reactor pressure vessel during nuclear reactor operation and the outer neutron stop ring comprises a neutron absorbing material that is different from the high temperature neutron absorbing material.

15. The apparatus of claim 11 wherein the annular neutron stop comprises a boron containing neutron absorber component in a thermally insulating matrix material.

* * * * *